United States Patent
Kawai et al.

(10) Patent No.: US 10,935,662 B2
(45) Date of Patent: Mar. 2, 2021

(54) LASER DISTANCE MEASURING APPARATUS

(71) Applicant: Mitsubishi Electric Corporation, Tokyo (JP)

(72) Inventors: Masahiro Kawai, Tokyo (JP); Yosuke Takagawa, Tokyo (JP); Shumpei Kameyama, Tokyo (JP)

(73) Assignee: Mitsubishi Electric Cornoration, Tokyo (JP)

( * ) Notice: Subject to any disclaimer, the term of this patent is extended or adjusted under 35 U.S.C. 154(b) by 0 days.

(21) Appl. No.: 16/545,072

(22) Filed: Aug. 20, 2019

(65) Prior Publication Data

US 2020/0103531 A1    Apr. 2, 2020

(30) Foreign Application Priority Data

Sep. 28, 2018 (JP) .............................. JP2018-183685

(51) Int. Cl.
*G01S 17/93* (2020.01)
*G01S 17/89* (2020.01)
*G01S 17/42* (2006.01)
*G01S 17/10* (2020.01)
*G01S 17/931* (2020.01)

(52) U.S. Cl.
CPC ............ *G01S 17/931* (2020.01); *G01S 17/10* (2013.01); *G01S 17/42* (2013.01); *G01S 17/89* (2013.01)

(58) Field of Classification Search
CPC ........ G01S 17/931; G01S 17/10; G01S 17/42; G01S 17/89; B60K 31/00; B60W 30/00; G01B 11/00; G01C 3/06; G08G 1/16
See application file for complete search history.

(56) References Cited

U.S. PATENT DOCUMENTS

2004/0080450 A1    4/2004   Cheong

FOREIGN PATENT DOCUMENTS

| JP | 11326499 A | 11/1999 | |
| JP | H11326499 A | * 11/1999 | ............ G01S 17/10 |
| JP | 2004151080 A | 5/2004 | |

(Continued)

OTHER PUBLICATIONS

Reason for Rejection communication dated Oct. 1, 2019 from the Japanese Patent Office in application No. 2018-183685.

*Primary Examiner* — Jamil Ahmed
(74) *Attorney, Agent, or Firm* — Sughrue Mion, PLLC; Richard C. Turner

(57) ABSTRACT

To provide a laser distance measuring apparatus that can set the irradiation range of the laser beam to the front ground surface appropriately regardless of the inclination of the front ground surface. A laser distance measuring apparatus controls the scanning mechanism to performs two-dimensional scan which scan laser beam in an irradiation angle range of the right and left direction to the traveling direction of own vehicle and scans laser beam in an irradiation angle range of the up and down direction with respect to the traveling direction of own vehicle; detects a relative inclination information of the up and down direction of a ground surface in front of own vehicle with respect to a ground surface where own vehicle is located; and moves the irradiation angle range of the up and down direction to up side or down side according to the relative inclination information.

2 Claims, 14 Drawing Sheets

(56) References Cited

FOREIGN PATENT DOCUMENTS

| | | | | |
|---|---|---|---|---|
| JP | 2010162975 | A * | 7/2010 | ........... G01S 13/867 |
| JP | 2010162975 | A | 7/2010 | |
| JP | 2011232230 | A | 11/2011 | |
| JP | 5413256 | B2 | 2/2014 | |
| JP | 2017015409 | A | 1/2017 | |

* cited by examiner

LASER DISTANCE MEASURING APPARATUS

INCORPORATION BY REFERENCE

The disclosure of Japanese Patent Application No. 2018-183685 filed on Sep. 28, 2018 including its specification, claims and drawings, is incorporated herein by reference in its entirety.

BACKGROUND

The present disclosure is related with a laser distance measuring apparatus.

Previously, there has been known the laser distance measuring apparatus which irradiates the laser beam to the measuring object, and measures the distance to the object based on the reflected light which is reflected from the object. There is the scanning type laser distance measuring apparatus which scans the laser beam emitted from the beam source in the specific range by the scanning mechanism. However, many of conventional laser distance measuring apparatuses are operating on a fixed apparatus condition. For example, the pulse laser beam source is not easy to drive emitted light at high power and high frequency, from the viewpoint of the reliability of the laser beam source itself. Since there is a limit to the point number obtained in one frame from the starting point to the end point of the scan field, it was not easy to achieve both the wide field of view and the high resolution.

In order to solve this problem, there is technology disclosed in JP 5413256 B. In the technology of JP 5413256 B, by scanning the measuring range coarsely, the observation region where the object exists is extracted. And, the scan field is narrowed to the observation region and the object is detected with high resolution.

SUMMARY

However, there is a next problem in the conventional laser distance measuring apparatus including JP 5413256 B. Especially, in the case of the laser distance measuring apparatus which is mounted on the vehicle and utilized for safety traveling, such as collision prevention to objects (other vehicles, a person, an obstacle, and the like), the optimum operation of the laser distance measuring apparatus depends on the traveling road condition. In the technology of JP 5413256 B, since the scan field is narrowed to the range in which the object exists, when a new object comes into the measuring range other than the narrowed scan field, there is a problem that detection of the new object is delayed or detection omission occurs.

If the inclination of the road surface in front of the vehicle changes, the measuring range which is required to detect the object by the laser distance measuring apparatus changes, according to the inclination of the front road surface. When the front road surface inclines to the up side, the required measuring range changes to the upper side than the case where the front road surface does not incline. When the front road surface inclines to the down side, the required measuring range changes to the lower side than the case where the front road surface does not incline. So as to cover the required measuring range which changes according to the inclination even if the inclination of the front road surface changes, it is considered that the irradiation area of the laser beam is previously expanded to the up and down direction. However, if the scan field of the up and down direction is expanded, the problem that the scanning interval of the up and down direction becomes wide, and the resolution of the up and down direction becomes coarse will occur. In order to improve resolution, it is considered to increase the scanning number in one frame and increase the number of measurement points of the up and down direction. However, the problem that the frame interval becomes long occurs.

Thus, it is desirable to provide a laser distance measuring apparatus that can set the irradiation range of the laser beam to the front ground surface appropriately regardless of the inclination of the front ground surface, and can suppresses that the resolution of the measurement point of the up and down direction becomes coarse and suppress that the frame interval becomes long for improvement in resolution.

A laser distance measuring apparatus according to the present disclosure including:

a laser beam generating unit that emits a laser beam;

a scanning mechanism that changes an irradiation angle of the laser beam, which is irradiated to front of an own vehicle, to a right and left direction and an up and down direction with respect to a traveling direction of the own vehicle;

a scanning control unit that controls the scanning mechanism to performs a two-dimensional scan which scan the laser beam in an irradiation angle range of the right and left direction with respect to the traveling direction of the own vehicle and scans the laser beam in an irradiation angle range of the up and down direction with respect to the traveling direction of the own vehicle;

a light receiving unit that receives a reflected light of the laser beam reflected by an object in front of the own vehicle, and outputs a light receiving signal;

a distance calculation unit that calculates a distance to the object which exists at the irradiation angle, based on the emitted laser beam, the light receiving signal, and the irradiation angle; and an inclination detection unit that detects a relative inclination information of the up and down direction of a ground surface in front of the own vehicle with respect to a ground surface where the own vehicle is located, wherein the scanning control unit moves the irradiation angle range of the up and down direction to up side or down side according to the relative inclination information.

According to the laser distance measuring apparatus of the present disclosure, when there is no inclination of the front ground surface, the irradiation angle range of the up and down direction can be set so that the irradiation angle of the laser beam with respect to the front ground surface becomes appropriate. Then, since the irradiation angle of the up and down direction is moved to the up side or the down side according to the inclination of the front ground surface, even if the front ground surface inclines, the irradiation range of the laser beam with respect to the front ground surface can be kept appropriate. Therefore, it is not necessary to set the irradiation angle range of the up and down direction wider than necessary, and it can suppress that the resolution of the measurement point of the up and down direction becomes coarse and suppress that the frame interval becomes long for improvement in resolution.

DETAILED DESCRIPTION OF THE EMBODIMENTS

1. Embodiment 1

Figure 1:
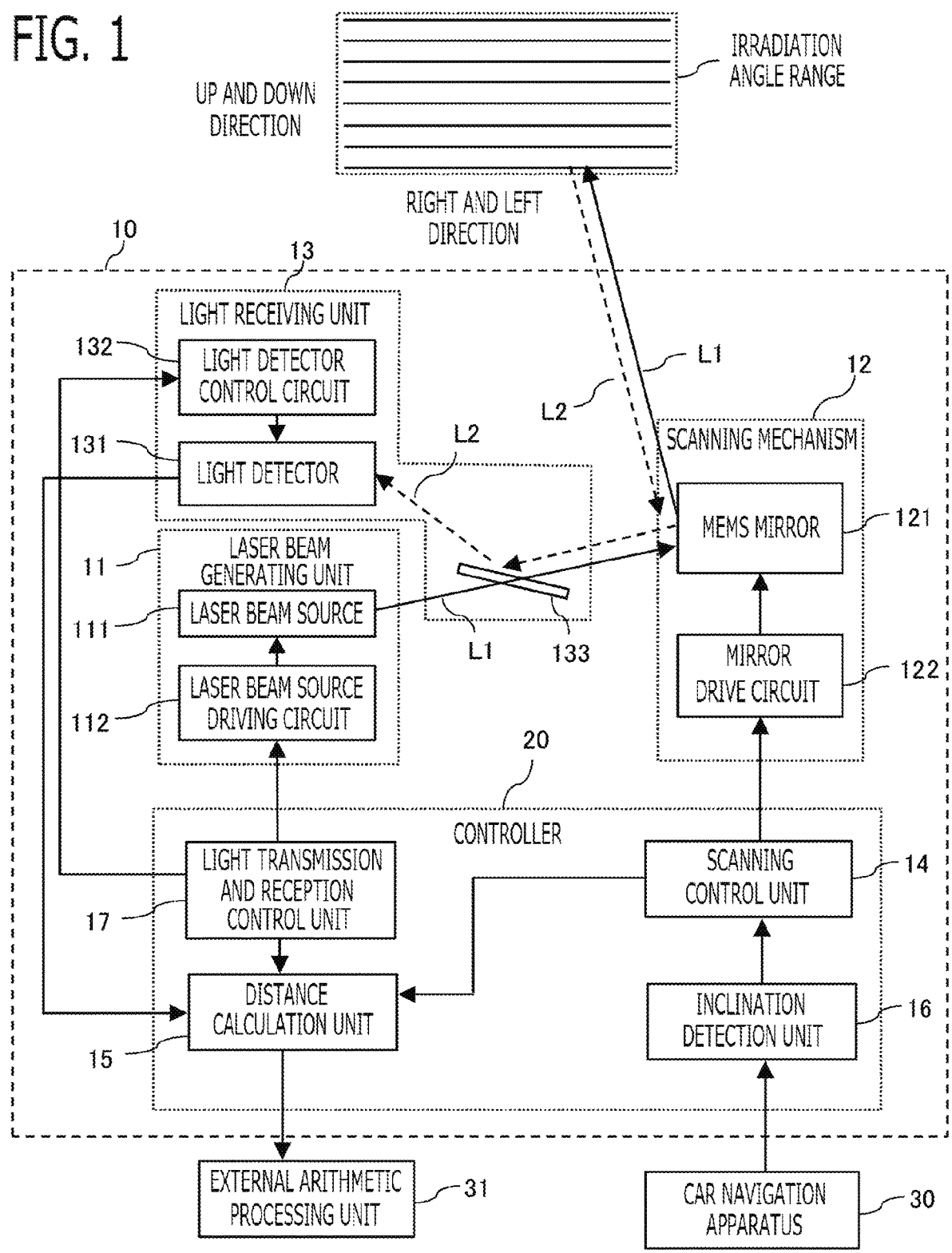
FIG. 1 shows a schematic configuration of the laser distance measuring apparatus according to Embodiment 1.
Figure 2:
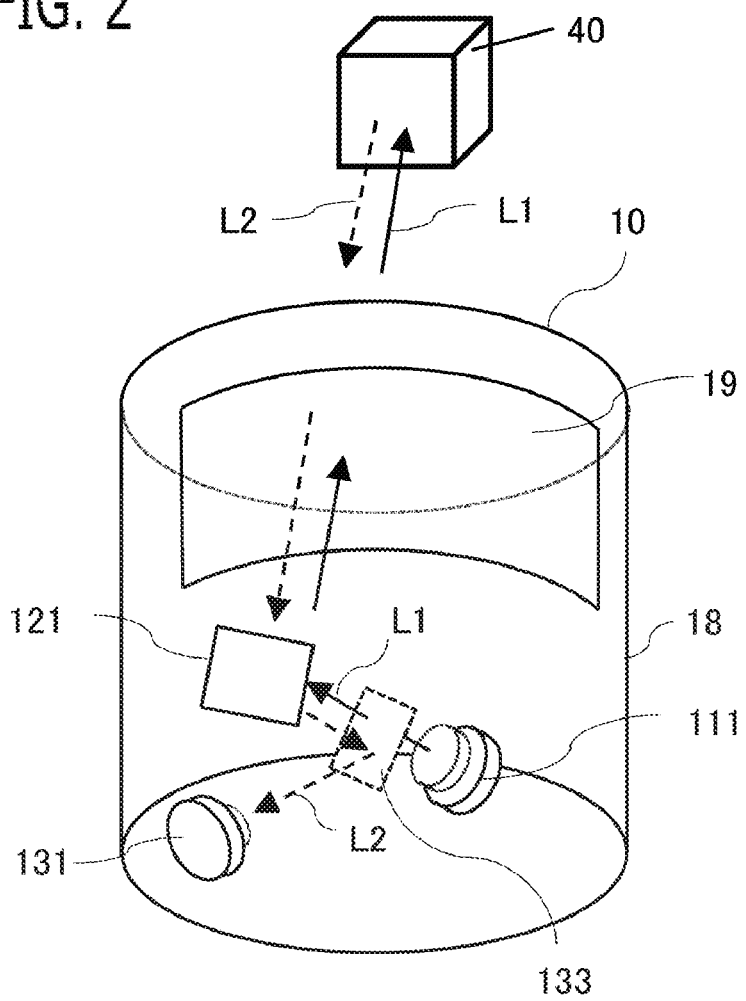
FIG. 2 shows a schematic diagram of the laser distance measuring apparatus according to Embodiment 1.

A laser distance measuring apparatus 10 according to Embodiment 1 will be explained with reference to drawings. FIG. 1 is a block diagram showing the schematic configuration of the laser distance measuring apparatus 10. FIG. 2 is a schematic diagram showing the schematic arrangement and configuration of the optical system of the laser distance measuring apparatus 10. The laser distance measuring apparatus 10 is also called LiDAR (Light Detection and Ranging) or a laser radar. The laser distance measuring apparatus 10 is mounted on an own vehicle. The laser distance measuring apparatus 10 irradiates a laser beam L1 to front of the own vehicle by a two-dimensional scan, and measures a distance to an object, which exists in front of the own vehicle, from the laser distance measuring apparatus 10 (the own vehicle).

The laser distance measuring apparatus 10 is provided with a laser beam generating unit 11, a scanning mechanism 12, a light receiving unit 13, a scanning control unit 14, a distance calculation unit 15, an inclination detection unit 16, and the like. As described later, the controller 20 is provided with the scanning control unit 14, the distance calculation unit 15, and the inclination detection unit 16. The laser beam generating unit 11 emits the laser beam L1. The scanning mechanism 12 changes an irradiation angle of the laser beam L1, which is irradiated to front of the own vehicle, to a right and left direction and an up and down direction with respect to a traveling direction of the own vehicle. The light receiving unit 13 receives a reflected light L2 of the laser beam reflected by an object in front of the own vehicle, and outputs a light receiving signal. The scanning control unit 14 controls the scanning mechanism 12 to performs a two-dimensional scan which scan the laser beam in an irradiation angle range of the right and left direction with respect to the traveling direction of the own vehicle, and scans the laser beam in an irradiation angle range of the up and down direction with respect to the traveling direction of the own vehicle. The distance calculation unit 15 calculates a distance to the object which exists at the irradiation angle based on the emitted laser beam L1, the light receiving signal, and the irradiation angle.

1-1. Laser Beam Generating Unit 11

Figure 8:
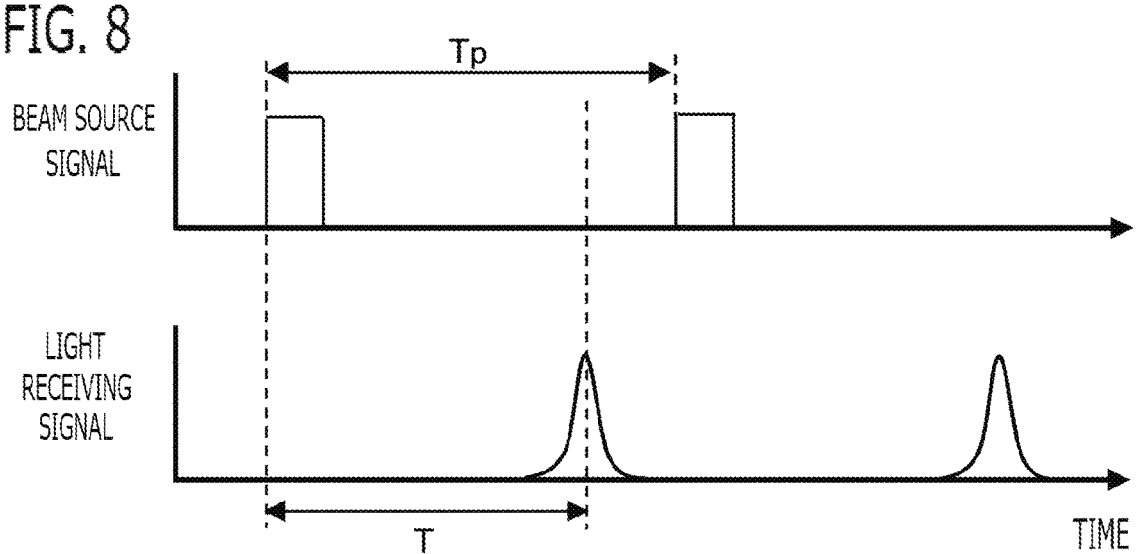
FIG. 8 is a time chart for explaining the beam source signal and the light receiving signal according to Embodiment 1.

The laser beam generating unit 11 emits the laser beam L1. The laser beam generating unit 11 is provided with a laser beam source 111 and a laser beam source driving circuit 112. The laser beam source driving circuit 112 generates a pulse signal (a beam source signal) which is turned ON in a pulse cycle Tp, as shown in FIG. 8. The laser beam source driving circuit 112 generates the pulse signal based on a command signal from a light transmission and reception control unit 17 described below. When the pulse signal transmitted from the laser beam source driving circuit 112 is turned ON, the laser beam source 111 generates the laser beam L1 of near infrared wavelength, and emits it toward the scanning mechanism 12. The laser beam L1 emitted from the laser beam source 111 transmits a collection mirror 133 disposed between the laser beam source 111 and the scanning mechanism 12.

1-2. Scanning Mechanism 12

The scanning mechanism 12 changes an irradiation angle of the laser beam L1, which is irradiated to front of the own vehicle, to the right and left direction and the up and down direction with respect to the traveling direction (an irradiation center line) of the own vehicle. The scanning mechanism 12 is provided with a movable mirror 121 and a mirror drive circuit 122. As shown in FIG. 2, the laser beam L1 emitted from the laser beam source 111 transmits the collection mirror 133 and is reflected by the movable mirror 121, and then it transmits the transmission window 19 provided in the housing 18 and is irradiated to front of the own vehicle at an irradiation angle according to angle of the movable mirror 121.

Figure 3:
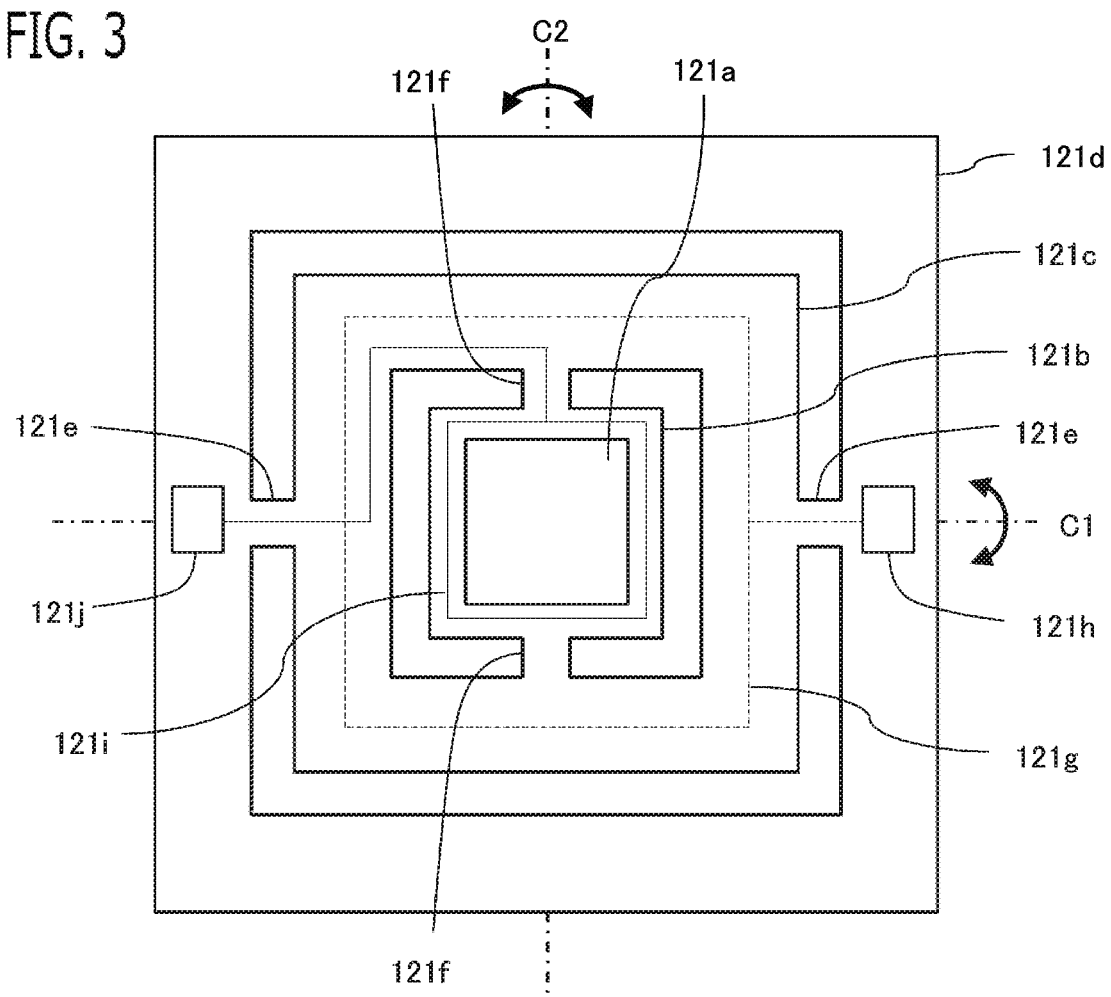
FIG. 3 is a figure for explaining the MEMS mirror according to Embodiment 1.

In the present embodiment, the movable mirror 121 is a MEMS mirror 121 (Micro Electro Mechanical Systems). As shown in FIG. 3, the MEMS mirror 121 is provided with a rolling mechanism which rotates a mirror 121a around a first axis C1 and a second axis C2 which are orthogonal to each other. The MEMS mirror 121 is provided with an inner frame 121b of a rectangular plate shape which is provided with the mirror 121a, an intermediate frame 121c of a rectangular ring plate shape disposed outside the inner frame 121b, and an outer frame 121d of a rectangular ring plate shape disposed outside the intermediate frame 121c. The outer frame 121d is fixed to a body of the MEMS mirror 121.

The outer frame 121d and the intermediate frame 121c are connected by right and left two first torsion bars 121e which have torsional elasticity. The intermediate frame 121c is twisted around a first axis C1 which connects the two first torsion bars 121e, with respect to the outer frame 121d. When twisted around the first axis C1 to one side or the other side, the irradiation angle of the laser beam L1 changes to the up side or the down side. The intermediate frame 121c and the inner frame 121b are connected by up and down two second torsion bars 121f which have elasticity. The inner frame 121b is twisted around a second axis C2 which connects the two second torsion bars 121f, with respect to the intermediate frame 121c. When twisted around the second axis C2 to one side or the other side, the irradiation angle of the laser beam L1 changes to the left side or the right side.

An annular first coil 121g along the frame is provided in the intermediate frame 121c. A first electrode pad 121h connected to the first coil 121g is provided in the outer frame 121d. An annular second coil 121i along the frame is provided in the inner frame 121b. A second electrode pad 121j connected to the second coil 121i is provided in the outer frame 121d. A permanent magnet (not shown) is provided in the MEMS mirror 121. When a positive or negative current flows into the first coil 121g, the Lorentz force which twists the intermediate frame 121c around the first axis C1 to one side or the other side occurs. And, the torsional angle is proportional to the magnitude of current. When a positive or negative current flows into the second coil 121i, the Lorentz force which twists the inner frame 121b around the second axis C2 to one side or the other side occurs. And, the torsional angle is proportional to the magnitude of current.

Figure 4:
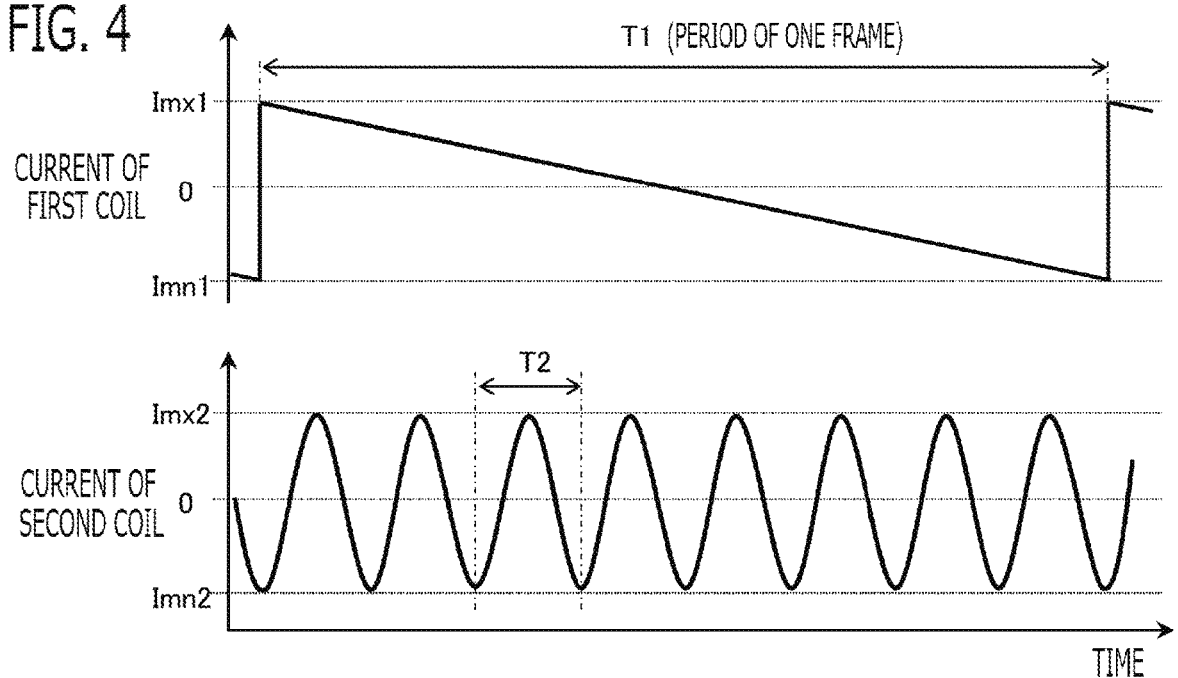
FIG. 4 is a time chart for explaining the driving current of the MEMS mirror according to Embodiment 1.
Figure 5:
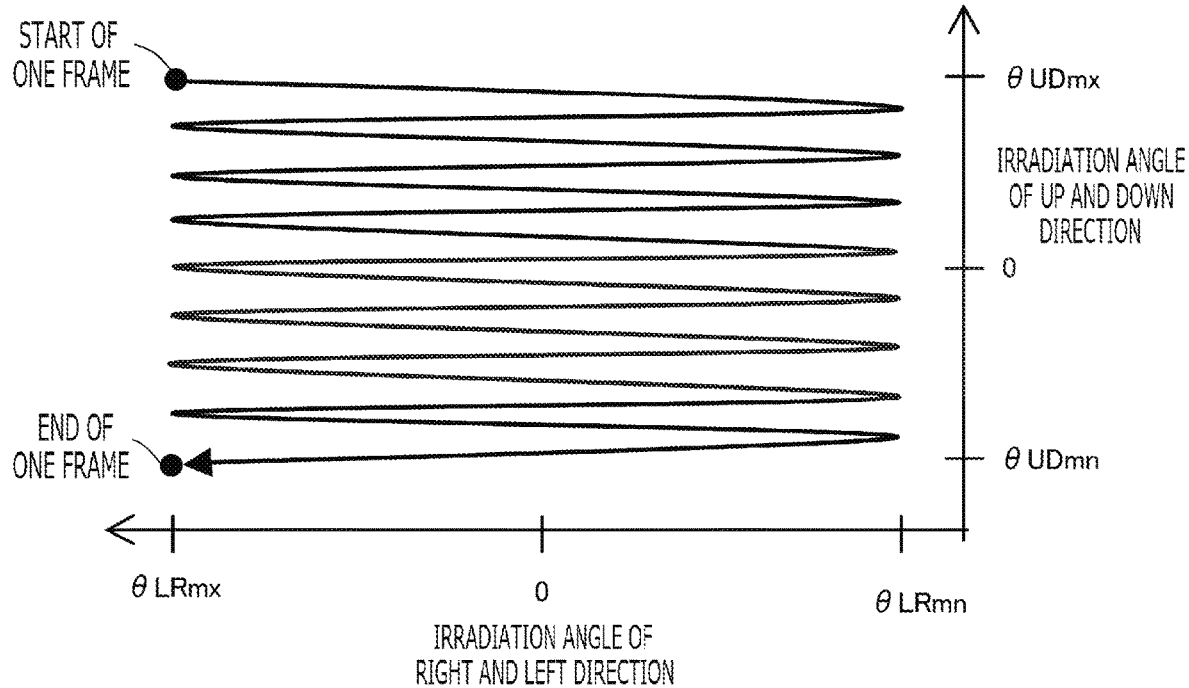
FIG. 5 is a figure for explaining the irradiation angle range of the up and down direction and the right and left direction according to Embodiment 1.

As shown in the upper row graph of FIG. 4, the mirror drive circuit 122 supplies a current, which oscillates between a positive first maximum current value Imx1 and a negative first minimum current value Imn1 at a first period T1, to the first coil 121g via the first electrode pad 121h, according to the command signal of the scanning control unit 14. The first period T1 is a period for one frame of the two-dimensional scan. The vibration waveform of current is a saw tooth wave, a triangular wave, or the like. As shown in FIG. 5, the laser beam oscillates between a maximum irradiation angle θUDmx of the up and down direction corresponding to the positive first maximum current value Imx1, and a minimum irradiation angle θUDmn of the up and down direction corresponding to the negative first minimum current value Imn1 at the first period T1. The irradiation angle of the up and down direction becomes parallel to the traveling direction of vehicle in case of zero; inclines to the up side with respect to the traveling direction of vehicle in case of positive; and inclines to the down side with respect to the traveling direction of vehicle in case of negative.

When the vibration waveform of current is shifted to the positive side or the negative side, the irradiation angle range of the up and down direction can be shifted to the up side or the down side. The mirror drive circuit 122 changes the vibration range of current (Imx1, Imn1) to the positive side or the negative side according to the command signal of the scanning control unit 14.

As shown in the lower row graph of FIG. 4, the mirror drive circuit 122 supplies a current, which oscillates between a positive second maximum current value Imx2 and a negative second minimum current value Imn2 at a second period T2, to the second coil 121i via the second electrode pad 121j, according to the command signal of the scanning control unit 14. The second period T2 is set to a value shorter than the first period T1, and is set to a value obtained by dividing the first period T1 by a reciprocation scanning frequency of the right and left direction in one frame. The vibration waveform of current is a sine wave, a rectangular wave, or the like. As shown in FIG. 5, the laser beam oscillates between a maximum irradiation angle θLRmx of the right and left direction corresponding to the positive second maximum current value Imx2, and a minimum irradiation angle θLRmn of the right and left direction corresponding to the negative second minimum current value Imn2 at the second period T2. The irradiation angle of the right and left direction becomes parallel to the traveling direction of vehicle in case of zero; inclines to the left side with respect to the traveling direction of vehicle in case of positive; and inclines to the right side with respect to the traveling direction of vehicle in case of negative.

1-3. Light Receiving Unit 13

The light receiving unit 13 receives a reflected light L2 of the laser beam reflected by an object in front of the own vehicle, and outputs a light receiving signal. The light receiving unit 13 is provided with a light detector 131, a light detector control circuit 132, and a collection mirror 133. As shown in FIG. 2, the reflected light L2 reflected by the object 40 in front of the own vehicle transmits the transmission window 19 and is reflected by the movable mirror 121, and then it is reflected by the collection mirror 133 and enters the light detector 131.

The light detector 131 is provided with APD (Avalanche Photo Diode) and the like as a photo detector, and outputs the light receiving signal according to the received reflected light L2. The light detector control circuit 132 controls operation of the light detector 131 based on the command signal from the light transmission and reception control unit 17. The light receiving signal outputted from the light detector 131 is inputted into the distance calculation unit 15.

1-4. Controller 20

Figure 6:
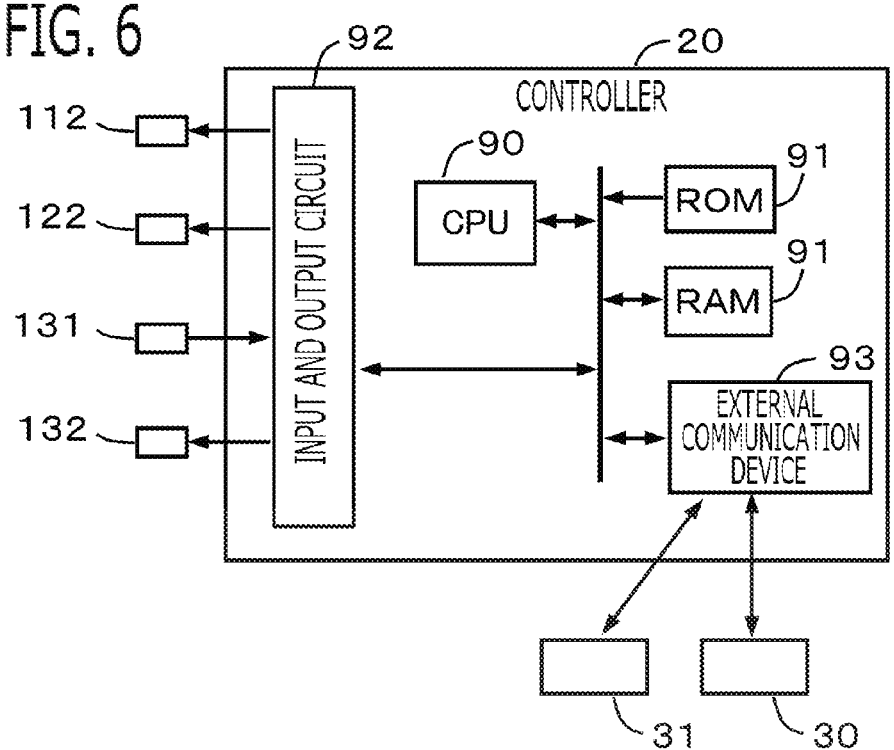
FIG. 6 is a hardware configuration diagram of the controller according to Embodiment 1.

The laser distance measuring apparatus 10 is provided with a controller 20. The controller 20 is provided with functional parts such as the scanning control unit 14, the distance calculation unit 15, the inclination detection unit 16, and the light transmission and reception control unit 17. Each function of the controller 20 is realized by processing circuits provided in the controller 20. Specifically, as shown in FIG. 6, the controller 20 is provided, as processing circuits, with an arithmetic processor (computer) 90 such as a CPU (Central Processing Unit), storage apparatuses 91 which exchange data with the arithmetic processor 90, an input and output circuit 92 which inputs and outputs external signals to the arithmetic processor 90, an external communication device 93 which performs data communication with external apparatus of the laser distance measuring apparatus 10, and the like.

As the arithmetic processor 90, ASIC (Application Specific Integrated Circuit), IC (Integrated Circuit), DSP (Digital Signal Processor), FPGA (Field Programmable Gate Array), various kinds of logical circuits, various kinds of signal processing circuits, and the like may be provided. As the arithmetic processor 90, a plurality of the same type ones or the different type ones may be provided, and each processing may be shared and executed. As the storage apparatuses 91, there are provided a RAM (Random Access Memory) which can read data and write data from the arithmetic processor 90, a ROM (Read Only Memory) which can read data from the arithmetic processor 90, and the like. As the storage apparatuses 91, various kinds of storage apparatus, such as a flash memory and EEPROM (Electrically Erasable Programmable Read Only Memory) may be used.

The input and output circuit 92 is connected to the laser beam source driving circuit 112, the mirror drive circuit 122, the light detector 131, the light detector control circuit 132, and the like; and is provided with a communication circuit which performs transmission and reception of data and a control command between these and the arithmetic processor 90, an input/output port, and the like. The external communication device 93 communicates with external apparatuses such as a car navigation apparatus 30 and an external arithmetic processing unit 31.

Then, the arithmetic processor 90 runs software items (programs) stored in the storage apparatus 91 such as a ROM and collaborates with other hardware devices in the controller 20, such as the storage apparatus 91, the input and output circuit 92, and the external communication device 93, so that the respective functions of the functional parts 14 to 17 included in the controller 20 are realized. Setting data items such as a determination distance to be utilized in the functional parts 14 to 17 are stored, as part of software items (programs), in the storage apparatus 91 such as a ROM. Each function of the controller 20 will be described in detail below.

1-4-1. Light Transmission and Reception Control Unit 17

The light transmission and reception control unit 17 transmits a command signal to the laser beam source driving circuit 112 to output a pulse form laser beam of a pulse cycle Tp. The light transmission and reception control unit 17 transmits a command signal to the light detector control circuit 132 to output a light receiving signal from the light detector 131.

1-4-2. Distance Calculation Unit 15

Figure 7:
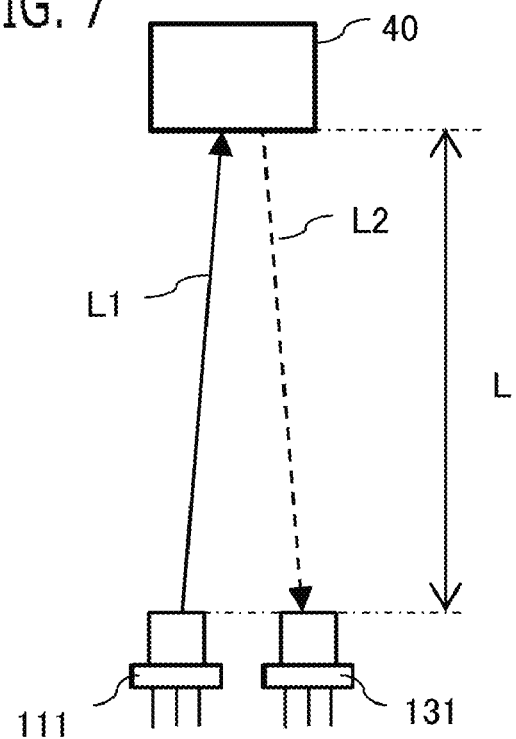
FIG. 7 is a figure for explaining the distance detection to the object according to Embodiment 1.

The distance calculation unit 15 calculates a distance to the object which exists at the irradiation angle based on the emitted laser beam L1, the light receiving signal, and the irradiation angle. As shown in FIG. 7, the laser beam L1 emitted from the laser beam source 111 is reflected by the object 40 which exists ahead by a distance L, and the reflected light L2 enters into the light detector 131 which exists backward by the distance L. FIG. 8 shows the relationship between the beam source signal of the laser beam L1 emitted from the laser beam source 111, and the light receiving signal of the reflected light L2 received by the light detector 131. The time T from the rising of the beam source signal to the peak of the light receiving signal is time for the laser beam to go and return the distance L between the laser beam source 111 and the light detector 131, and the object 40. Therefore, the distance L to the object 40 can be calculated by multiplying the velocity of light to the time T, and dividing by 2.

The distance calculation unit 15 measures, as a light receiving time, a time T from a time point when the laser beam generating unit 11 starts to emit the pulse form laser beam L1 to a time point when the light receiving unit 13 outputs the light receiving signal. Then, the distance calculation unit 15 calculates a value obtained by multiplying the velocity of light to the light receiving time, and dividing by 2, as the distance L to the object which exists at the irradiation angle at emitting the laser beam L1. In addition to the distance L, the distance calculation unit 15 also detects an intensity of the reflected light L2 based on the magnitude of the light receiving signal. When the light receiving unit 13 is not outputting the light receiving signal, the distance calculation unit 15 determines that the object which exists at the irradiation angle at that time cannot be detected, and does not calculate the distance L. The distance calculation unit 15 transmits the calculating result of distance to the external arithmetic processing unit 31.

1-4-3. Inclination Detection Unit 16

The inclination detection unit 16 detects a relative inclination information of the up and down direction of a ground surface in front of the own vehicle with respect to a ground surface where the own vehicle is located. In the present embodiment, the inclination detection unit 16 obtains an altitude information or an inclination information of the ground surface where the own vehicle is located and the ground surface in front of the own vehicle, from the car navigation apparatus 30 as an external apparatus; and detects the relative inclination information based on the altitude information or the inclination information. Herein, the ground surface means a surface where the wheels of the own vehicle ride on. The ground surface also includes ground surface of three-dimensional structures, such as the tunnel and the multistory parking space.

The car navigation apparatus 30 detects a position (latitude, longitude, altitude), a traveling direction, and the like of the own vehicle by position information detection machines, such as a GPS (Global Positioning System) receiver, an acceleration sensor, and an azimuth sensor. Then, with reference to a map data which stored road information and the like, the car navigation apparatus 30 obtains surrounding road information and the like of the own vehicle, and determines the road where the own vehicle is running. The road information includes altitude information and inclination information of the ground surface at each point of road or earth's surface.

A plurality of variations can be considered as content of relative inclination information, and two variations are explained below.

<First Example of Relative Inclination Information>

A distance measurement range in front of the laser distance measuring apparatus 10 is predetermined by specifications, such as intensity of the laser beam, and light receiving sensitivity of the light detector 131. The inclination detection unit 16 detects, as the relative inclination information, a relative inclination angle of the ground surface in the distance measurement range in front of the own vehicle, with respect to the ground where the own vehicle is located.

In the present embodiment, the inclination detection unit 16 obtains an inclination angle of the road surface of the road where the own vehicle is presently located, from the car navigation apparatus 30. Herein, the inclination angle is an inclination angle along the traveling direction of the own vehicle with respect to the horizontal direction. Alternatively, when the information on the inclination angle of the road cannot be directly obtained from the car navigation apparatus 30, the inclination detection unit 16 obtains the altitude information of the road surface of the road where the own vehicle is presently located, and the altitude information of the road surface of the road in front and in rear of the own vehicle, from the car navigation apparatus 30; and calculates the inclination angle of the road surface of the road where the own vehicle is located based on the obtained altitude information.

The inclination detection unit 16 obtains the inclination angle of the road surface which is located ahead by a determination distance from the own vehicle, from the car navigation apparatus 30. The determination distance is set within the distance measurement range. Alternatively, the inclination detection unit 16 obtains the altitude information of the road surface of the road which is located ahead by the determination distance from the own vehicle, and the altitude information of the road surface of the road in front and in rear of it, from the car navigation apparatus 30; and calculates the inclination angle of the road surface of the road which is located ahead by the determination distance from the own vehicle, based on the obtained altitude information. When the front road curves, the inclination detection unit 16 obtains the inclination angle of the road surface of the road which is located ahead by the determination distance from the own vehicle, along the curved road. Alternatively, when the own vehicle is running on place other than road, the inclination detection unit 16 may obtain the altitude information or the inclination angle of point other than road, from the car navigation apparatus 30.

Then, the inclination detection unit 16 calculates, as the relative inclination angle, an angle obtained by subtracting the inclination angle of the road surface of the road where the own vehicle is located, from the inclination angle of the road surface which is located ahead by the determination distance from the own vehicle.

<Second Example of Relative Inclination Information>

The inclination detection unit 16 detects, as the relative inclination information, a relative height of the up and down direction of the ground surface, which is ahead by the determination distance from the own vehicle, with respect to the ground surface where the own vehicle is located.

In the present embodiment, the inclination detection unit 16 obtains an altitude information of the road surface of the road where the own vehicle is presently located, from the car navigation apparatus 30. The inclination detection unit 16 obtains the altitude information of the road surface which is located ahead by the determination distance from the own vehicle, from the car navigation apparatus 30. When the front road curves, the inclination detection unit 16 obtains the altitude information of the road surface of the road which is located ahead by the determination distance from the own vehicle, along the curved road. Alternatively, when the own vehicle is running on place other than road, the inclination detection unit 16 may obtain the altitude information of point other than road, from the car navigation apparatus 30.

Then, the inclination detection unit 16 calculates, as a relative height, an altitude obtained by subtracting the altitude of the road surface of the road where the own vehicle is located, from the altitude of the road surface which is located ahead by the determination distance from the own vehicle.

1-4-4. Scanning Control Unit 14

The scanning control unit 14 controls the scanning mechanism 12 to performs a two-dimensional scan which scan the laser beam L1 in an irradiation angle range of the right and left direction with respect to the traveling direction of the own vehicle, and scans the laser beam L1 in an irradiation angle range of the up and down direction with respect to the traveling direction of the own vehicle.

In the present embodiment, as mentioned above, the scanning control unit 14 transmits the command signal to scan the irradiation angle of the laser beam L1 in the irradiation angle range of the up and down direction at the first period T1, to the mirror drive circuit 122. Specifically, the scanning control unit 14 transmits the command signal of the positive first maximum current value Imx1 and the negative first minimum current value Imn1 of the current supplied to the first coil 121g, and the first period T1, to the mirror drive circuit 122.

And, the scanning control unit 14 transmits the command signal to scan the irradiation angle of the laser beam L1 in the irradiation angle range of the right and left direction at the second period T2, to the mirror drive circuit 122. Specifically, the scanning control unit 14 transmits the command signal of the positive second maximum current value Imx2 and the negative second minimum current value Imn2 of the current supplied to the second coil 121i, and the second period T2, to the mirror drive circuit 122. The scanning control unit 14 sets a value obtained by dividing the first period T1 by the reciprocation scanning frequency of the right and left direction in one frame, to the second period T2.

As shown in FIG. 5, the irradiation angle of the laser beam L1 is scanned once in the two-dimensional scan field of rectangular shape in the first period T1. This one scan of the two-dimensional scan field is called as one frame.

<Problem of Scanning Control>

Figure 9A:
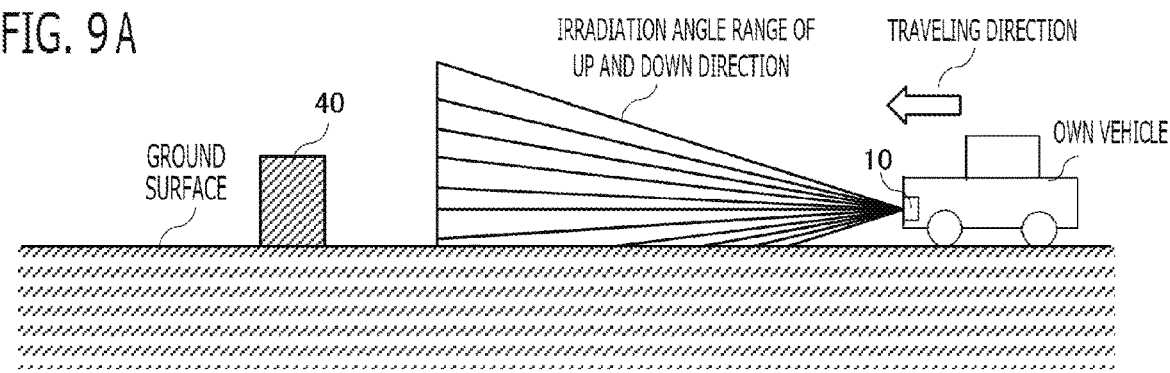
FIG. 9A to FIG. 9C are figures for explaining the control behavior according to a comparative example.
Figure 9B:
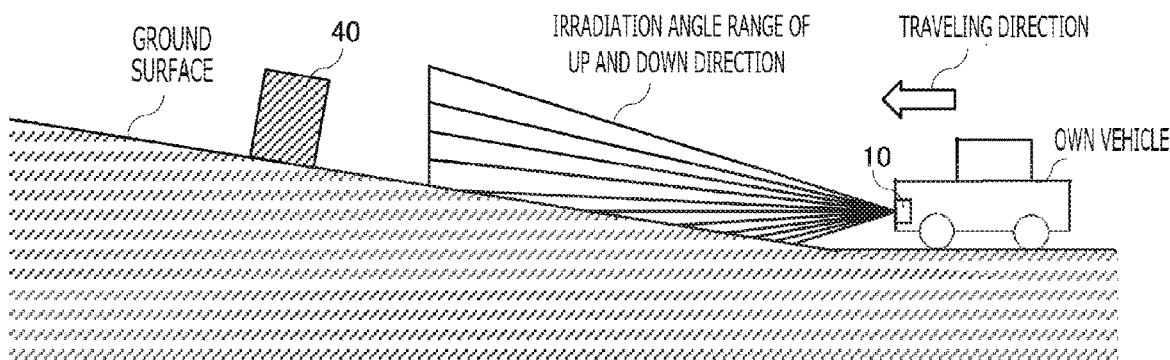
Figure 9C:
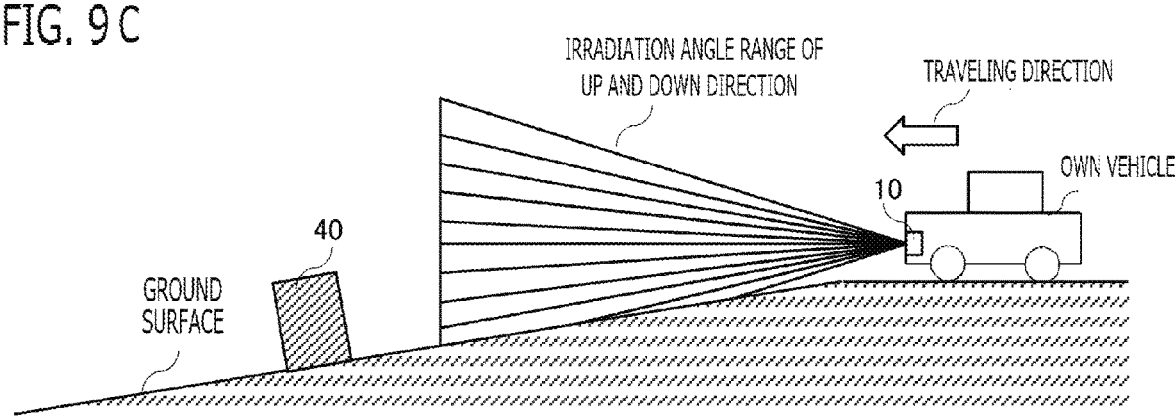

FIG. 9A to FIG. 9C show control behavior of comparative example where the irradiation angle range of the up and down direction to the traveling direction of the own vehicle is not changed, even if the inclination of the ground surface in front of the own vehicle changes. FIG. 9A shows a case where the front ground surface does not incline, FIG. 9B shows a case where the front ground surface inclines to the up side, and FIG. 9C shows a case where the front ground surface inclines to the down side.

As shown in the comparative example of FIG. 9A to FIG. 9C, in the case of FIG. 9B where the front ground surface inclines to the up side, compared with the case of FIG. 9A where the front ground surface does not incline, an irradiation angle range of the up and down direction of the laser beam which hits the ground surface increases, and an irradiation angle range of the up and down direction of the laser beam which is irradiated above the ground surface decreases. On the other hand, in the case of FIG. 9C where the front ground surface inclines to the down side, compared with the case of FIG. 9A where the front ground surface does not incline, an irradiation angle ranges of the up and down direction of the laser beam which hits the ground surface decrease, and an irradiation angle range of the up and down direction of the laser beam which is irradiated above the ground surface increases.

By the way, in order to detect objects 40 which exist above the front ground surface, such as a vehicle, a pedestrian, and an obstacle, it is necessary to secure a certain irradiation angle range of the up and down direction of the laser beam which is irradiated above the ground surface. On the other hand, in order to detect road markings, such as road shape and white line, it is necessary to secure a certain irradiation angle range of the up and down direction of the laser beam which hits the ground surface.

In the case of the comparative example of FIG. 9A to FIG. 9C, in order to secure a certain irradiation angle range which hits the ground surface and a certain irradiation angle range which is irradiated above the ground surface even if the inclination of the front ground surface changes, the irradiation angle range of the up and down direction of the laser beam is previously set wide. However, if the irradiation angle range of the up and down direction is expanded, there is a problem that the scanning interval of the up and down direction becomes wide, and the resolution of the measurement point of the up and down direction becomes coarse. In order to improve resolution, although it is considered to increase the scanning number of the right and left direction in one frame, there is a problem that the frame interval becomes long. Therefore, it is desirable to provide a laser distance measuring apparatus that can set the irradiation angle range of the laser beam to the front ground surface appropriately regardless of the inclination of the front ground surface, and can suppresses that the resolution of the measurement point of the up and down direction becomes coarse and suppress that the frame interval becomes long for improvement in resolution.

<Movement Controls of Irradiation Angle Range of Up and Down Direction>

Then, the scanning control unit 14 moves the irradiation angle range of the up and down direction to the up side or the down side, according to the relative inclination information of the up and down direction of the ground surface in front of the own vehicle with respect to the ground surface where the own vehicle is located. According to this configuration, when there is no inclination of the front ground surface, the irradiation angle range of the up and down direction can be set so that the irradiation angle range of the up and down direction with respect to the front ground surface becomes appropriate. Then, since the irradiation angle range of the up and down direction is moved to the up side or the down side according to the inclination of the front ground surface, even if the front ground surface inclines, the irradiation angle range of the up and down direction with respect to the front ground surface can be kept appropriate. Therefore, it is not necessary to set the irradiation angle range of the up and down direction wider than necessary, and it can suppress that the resolution of the measurement point of the up and down direction becomes coarse and suppress that the frame interval becomes long for improvement in resolution.

For example, when the ground surface in front of the own vehicle inclines to the down side with respect to the ground surface where the own vehicle is located, the scanning control unit 14 moves the irradiation angle range of the up and down direction to the down side according to the relative inclination degree. When the ground surface in front of the own vehicle inclines to the up side with respect to the ground surface where the own vehicle is located, the scanning control unit 14 moves the irradiation angle range of the up and down direction to the up side, according to the relative inclination degree.

<First Example of Relative Inclination Information>

The following describes the case where the inclination detection unit 16 detects, as the relative inclination information, the relative inclination angle of the ground surface in the distance measurement range in front of the own vehicle with respect to the ground surface where the own vehicle is located. In this case, the scanning control unit 14 moves the irradiation angle range of the up and down direction to the up side or the down side, according to the relative inclination angle.

Figure 10:
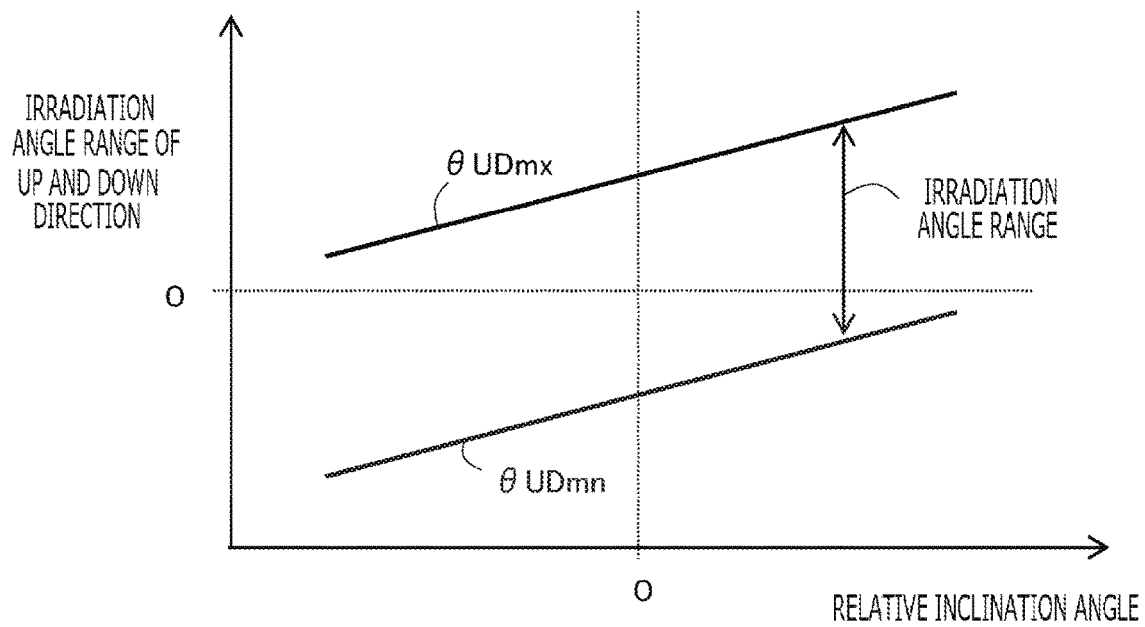
FIG. 10 is a figure for explaining movement of the irradiation angle range according to the relative inclination angle according to Embodiment 1.

As shown in FIG. 10, the scanning control unit 14 moves the irradiation angle range of the up and down direction to the up side or the down side in proportion to the relative inclination angle. Since the front ground surface inclines to the down side when the relative inclination angle is negative, the irradiation angle range of the up and down direction is moved to the down side (the negative side). Since the front ground surface inclines to the up side when the relative inclination angle is positive, the irradiation angle range of the up and down direction is moved to the up side (the positive side). For example, the scanning control unit 14 changes the irradiation angle range of the up and down direction by a moving angle which is proportional to the relative inclination angle, from a reference range when the relative inclination angle is zero.

Figure 11:
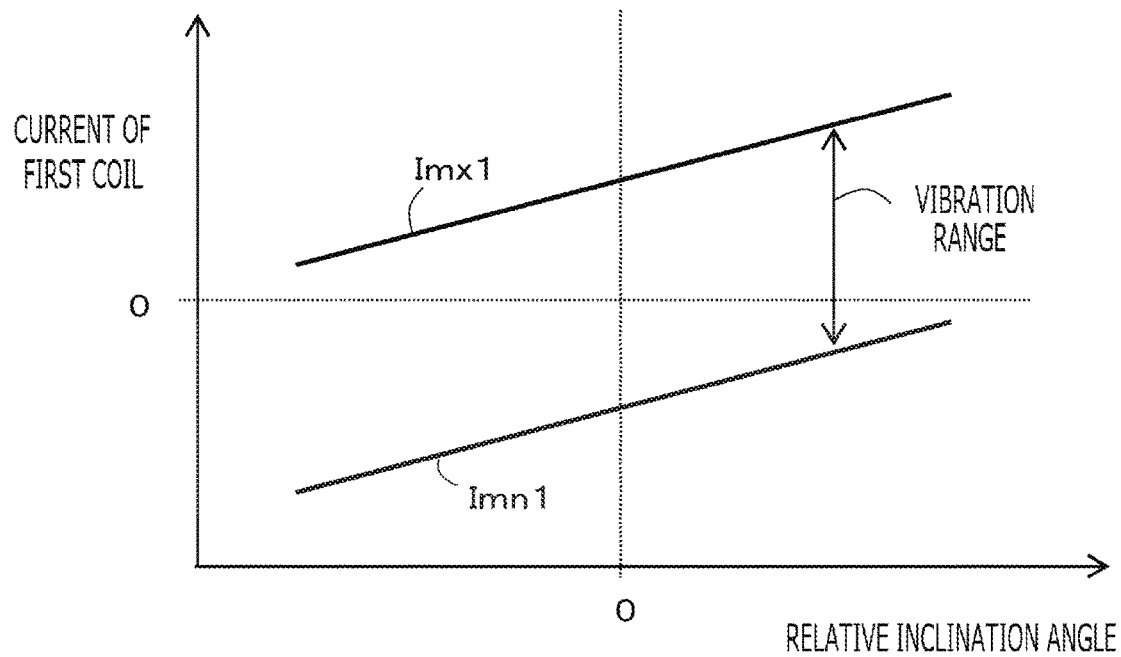
FIG. 11 is a figure for explaining movement of the current value according to the relative inclination angle according to Embodiment 1.

In the present embodiment, as shown in FIG. 11, the scanning control unit 14 changes the first maximum current value Imx1 and the first minimum current value Imn1, in proportion to the relative inclination angle. The scanning control unit 14 changes the first maximum current value Imx1 and the first minimum current value Imn1 by a moving current value which is proportional to the relative inclination angle, from a reference value when the relative inclination angle is zero.

<Second Example of Relative Inclination Information>

The following describes the case where the inclination detection unit 16 detects, as the relative inclination information, the relative height of the up and down direction of the ground surface, which is ahead by the determination distance from the own vehicle, with respect to the ground surface where the own vehicle is located. In this case, the scanning control unit 14 moves the irradiation angle range of the up and down direction to the up side or the down side, according to the relative height of the up and down direction. According to this configuration, since the relative height increases or decreases continuously as the own vehicle approaches the start point of inclination, the irradiation angle range of the up and down direction can be changed continuously.

Figure 12:
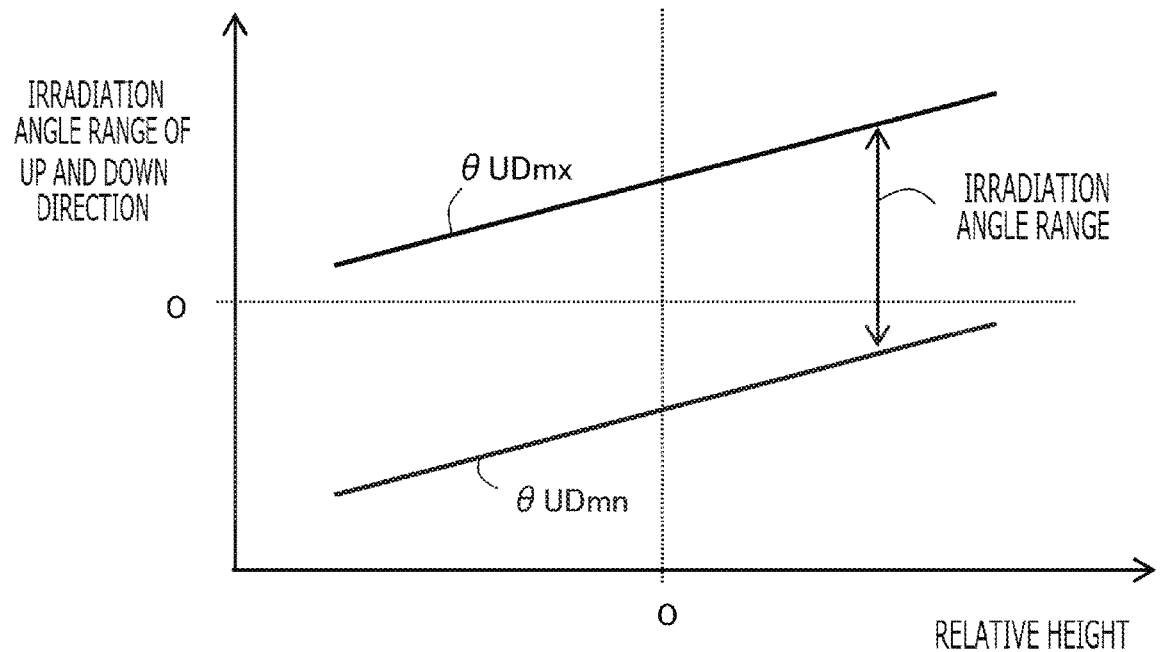
FIG. 12 is a figure for explaining movement of the irradiation angle range according to the relative height according to Embodiment 1.

As shown in FIG. 12, the scanning control unit 14 moves the irradiation angle range of the up and down direction to the up side or the down side, in proportion to the relative height. Since the front ground surface inclines to the down side when the relative height is negative, the irradiation angle range of the up and down direction is moved to the down side (the negative side). Since the front ground surface inclines to the up side when the relative height is positive, the irradiation angle range of the up and down direction is moved to the up side (the positive side). For example, the scanning control unit 14 changes the irradiation angle range of the up and down direction by a moving angle which is proportional to the relative height, from a reference range when the relative height is zero.

Figure 13:
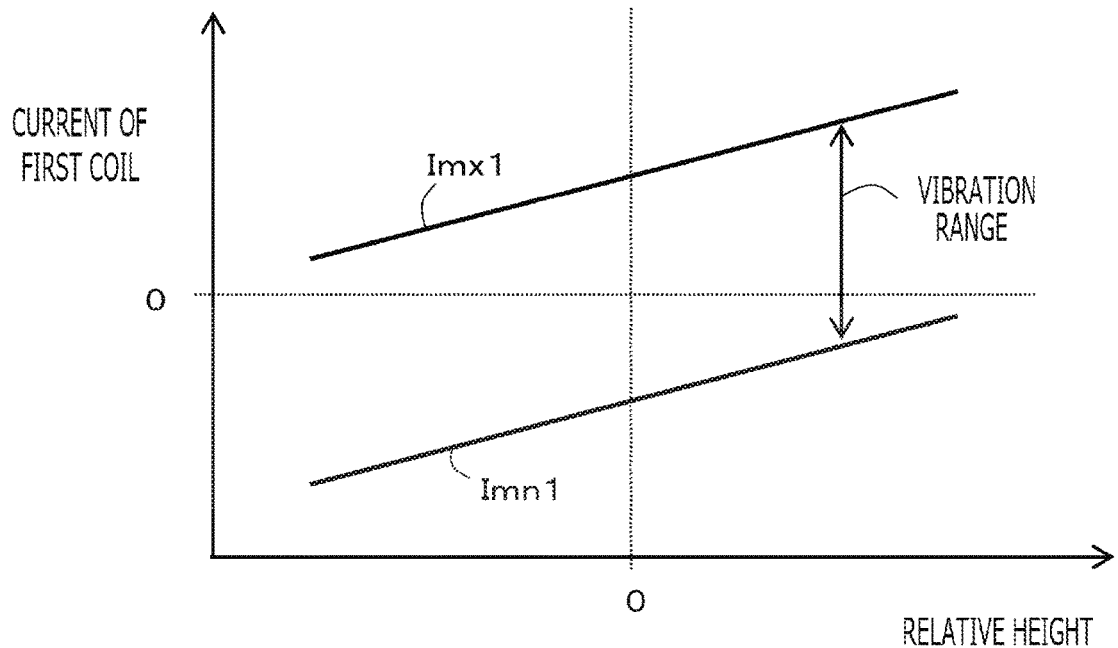
FIG. 13 is a figure for explaining movement of the current value according to the relative height according to Embodiment 1.

In the present embodiment, as shown in FIG. 13, the scanning control unit 14 changes the first maximum current value Imx1 and the first minimum current value Imn1, in proportion to the relative height. The scanning control unit 14 changes the first maximum current value Imx1 and the first minimum current value Imn1 by a moving current value which is proportional to the relative height, from a reference value when the relative height is zero.

<Control Behavior>

Figure 14A:
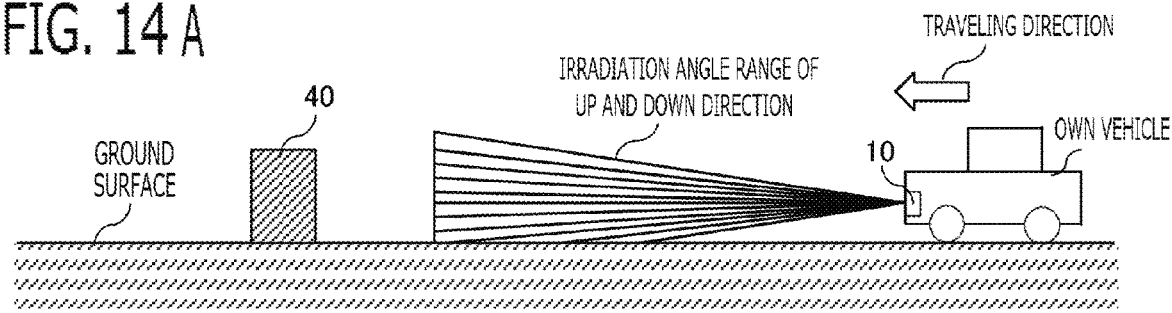
FIG. 14A to FIG. 14C are figures for explaining the control behavior according to Embodiment 1.
Figure 14B:
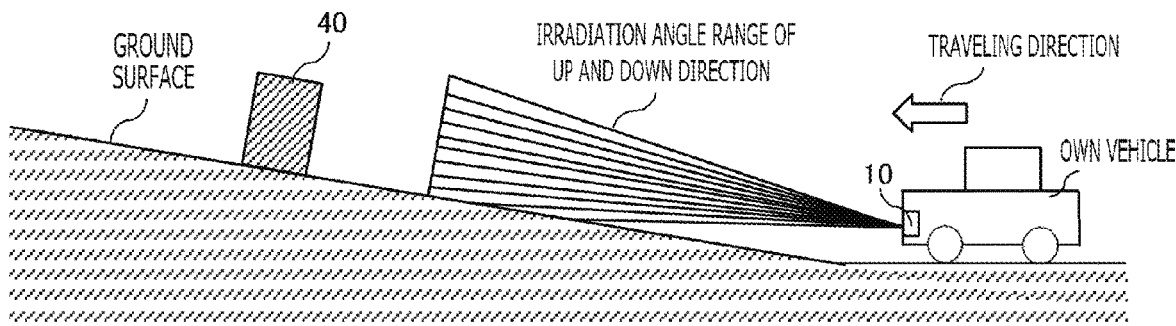
Figure 14:
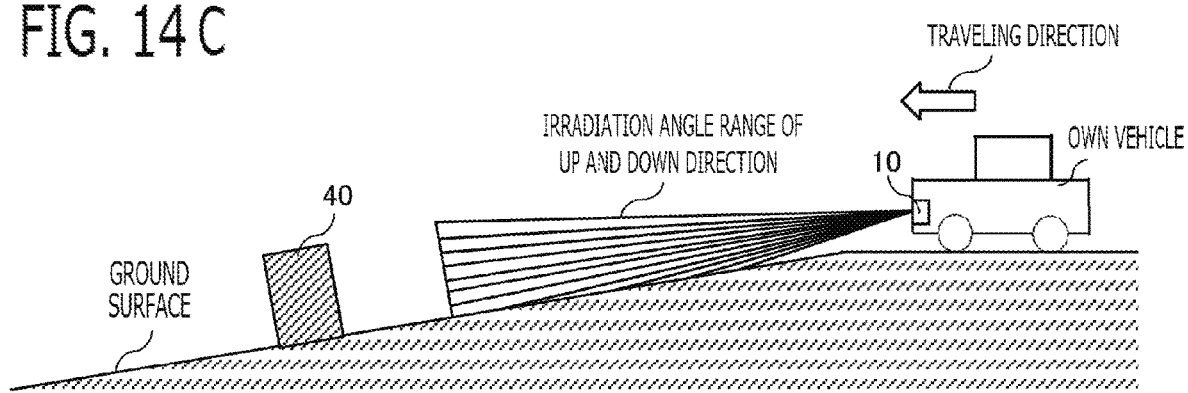

FIG. 14A to FIG. 14C show control behavior in the case of performing moving control of the irradiation angle range of the up and down direction according to the present embodiment. Similarly to FIG. 9A to FIG. 9C, FIG. 14A shows a case where the front ground surface does not incline, FIG. 14B shows a case where the front ground surface inclines to the up side, and FIG. 14C shows a case where the front ground surface inclines to the down side.

As shown in FIG. 14A, when there is no inclination of the front ground surface, the irradiation angle range of the up and down direction is set so that an irradiation angle range which hits the ground surface and an irradiation angle range which is irradiated above the ground surface become appropriate. Therefore, the irradiation angle range of the up and down direction is not set wider than necessary. Compared with the comparative example of FIG. 9, the resolution of the measurement point of the up and down direction can be improved, without increasing the scanning number of the right and left direction in one frame.

As shown in FIG. 14B, when the front ground surface inclines to the up side, the irradiation angle range of the up and down direction is moved to the up side according to the inclination. Therefore, even if the front ground surface inclines to the up side, the irradiation angle range which hits the ground surface and the irradiation angle range which is irradiated above the ground surface can be kept appropriate.

As shown in FIG. 14C, when the front ground surface inclines to the down side, the irradiation angle range of the up and down direction is moved to the down side according to the inclination. Therefore, even if the front ground surface inclines to the down side, the irradiation angle range which hits the ground surface and the irradiation angle range which is irradiated above the ground surface can be kept appropriate.

2. Embodiment 2

Figure 15:
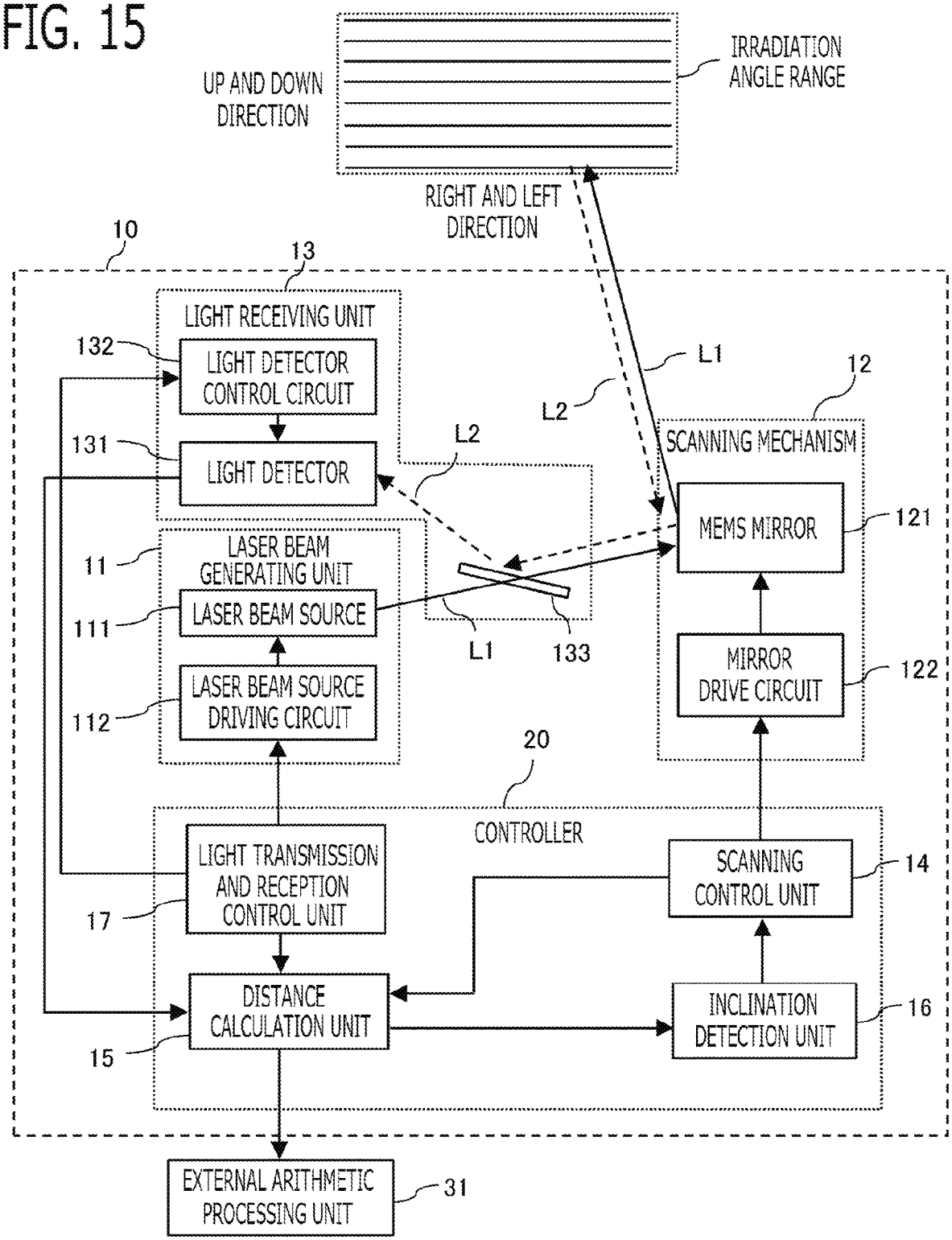
FIG. 15 shows a schematic configuration of the laser distance measuring apparatus according to Embodiment 2.

Next, the laser distance measuring apparatus 10 according to Embodiment 2 will be explained. The explanation for constituent parts the same as those in Embodiment 1 will be omitted. The basic configuration of the laser distance measuring apparatus 10 according to the present embodiment is the same as that of Embodiment 1; however, Embodiment 2 is different from Embodiment 1 in configuration that the inclination detection unit 16 detects the relative inclination information based on the measurement result of distance by the distance calculation unit 15. FIG. 15 shows the schematic configuration of the laser distance measuring apparatus 10 according to the present embodiment.

In the present embodiment, the inclination detection unit 16 obtains the relative height information of the up and down direction of the ground surface in front of the own vehicle with respect to the ground surface where the own vehicle is located, based on the measurement result of distance by the distance calculation unit 15; and detects the relative inclination information based on the obtained relative height information. According to this configuration, without depending on the external apparatus, the relative inclination information can be detected with high reliability.

Figure 16:
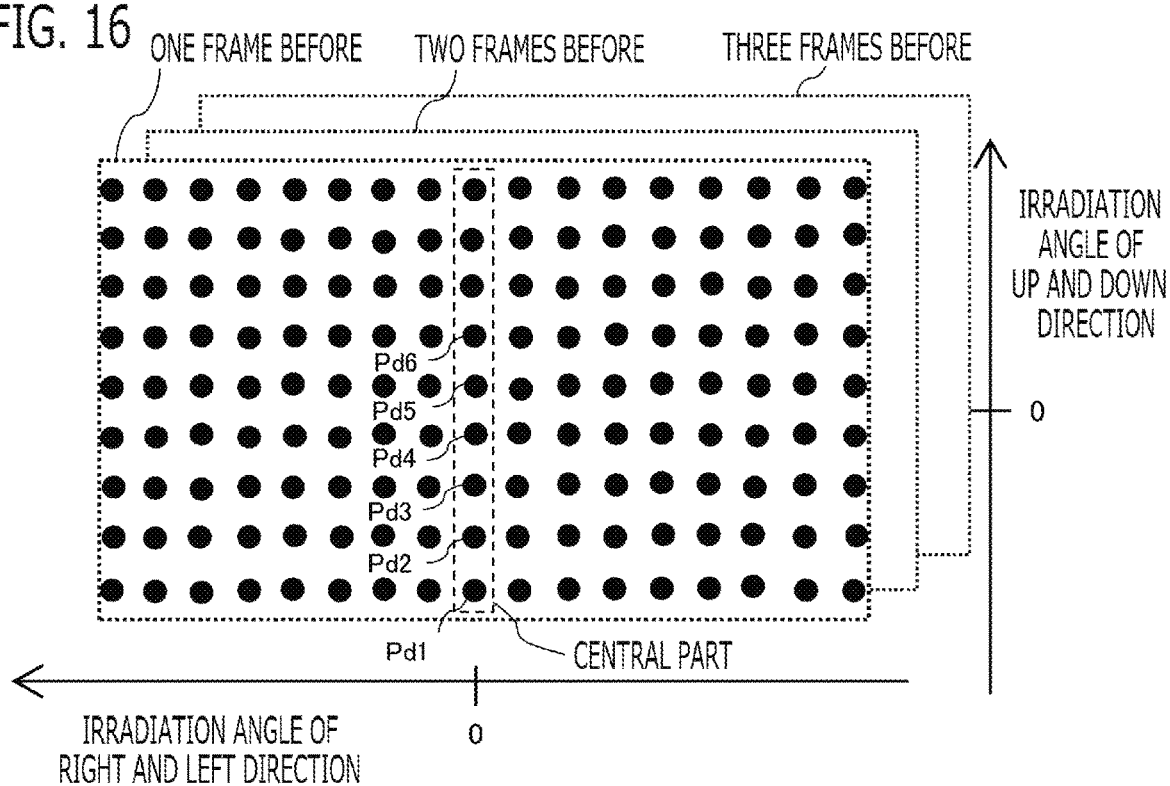
FIG. 16 is a figure for explaining processing of frame according to Embodiment 2.

As shown in FIG. 16, the inclination detection unit 16 calculates the relative height information of the up and down direction of the front ground surface, based on the measurement result of distance of at least one frame before at each irradiation angle Pd1, Pd2, . . . of the up and down direction in the central part of the irradiation angle range of the right and left direction. According to this configuration, compared with the case where all the information of one frame is used, since few information in the central part is used, calculation processing load can be reduced. Since the information of one frame before is used, the newest state of the ground surface can be detected. The inclination detection unit 16 may perform statistical processing such as averaging, using the information of plural past frames.

Figure 17:
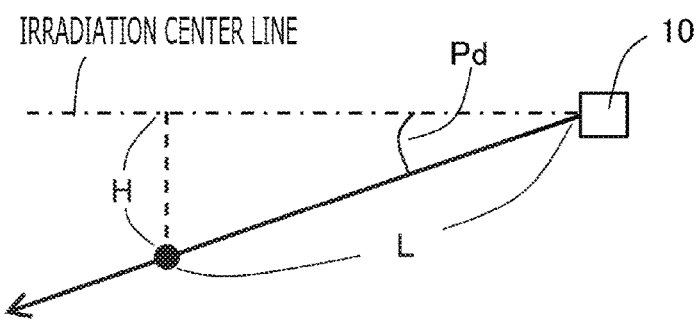
FIG. 17 is a figure for explaining calculation of the height of the ground surface at each irradiation angle according to Embodiment 2.

As shown in FIG. 17, using trigonometric function, based on the irradiation angle Pd of the up and down direction with respect to the irradiation center line which is parallel to the traveling direction of the vehicle, and the distance L to the detected ground surface, a height H of the ground surface with respect to the irradiation center line can be calculated. The inclination detection unit 16 calculates the height of the ground surface with respect to the irradiation center line based on the irradiation angle and the measured value of distance, about each irradiation angle Pd1, Pd2, . . . of the up and down direction.

Figure 18:
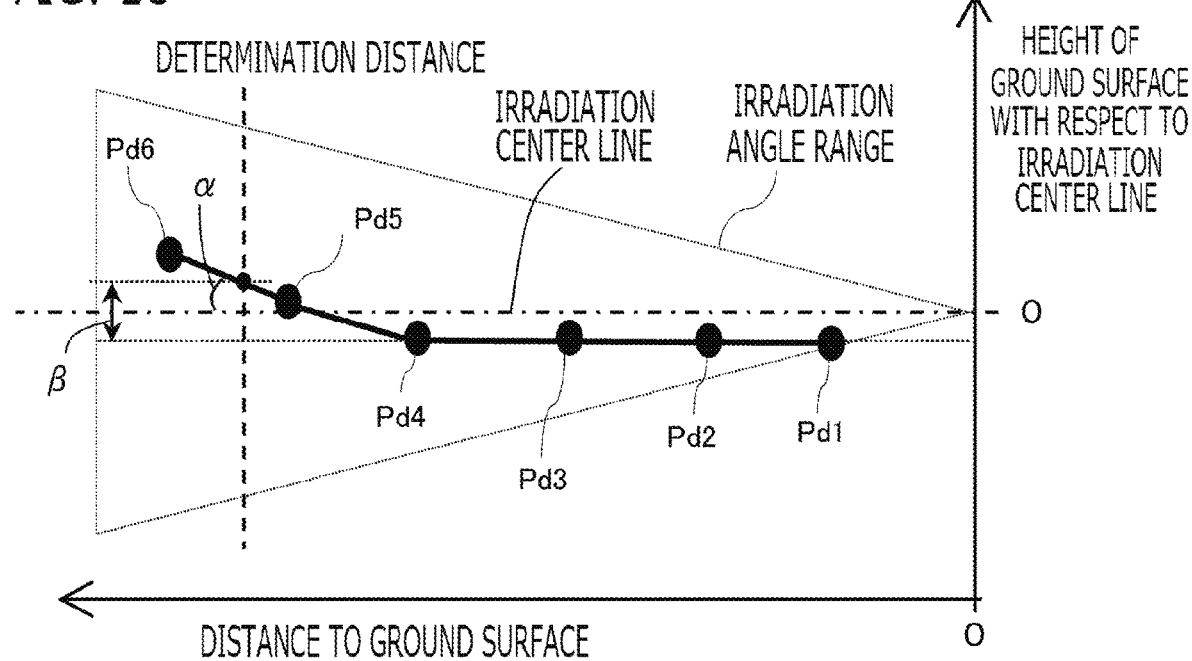
FIG. 18 is a figure for explaining calculation of the height of the ground surface at each irradiation angle according to Embodiment 2.

FIG. 18 shows an example of the relationship between the detected distance to the ground surface, and the height of the ground surface with respect to the irradiation center line, about each irradiation angle Pd1, Pd2, . . . of the up and down direction. Since the height of the ground surface with respect to the irradiation center line is the same from the first irradiation angle Pd1 to the fourth irradiation angle Pd4, it can be determined that the relative inclination angle of the ground surface in this range is zero, and the relative height of the ground surface in this range is zero. On the other hand, since the height of the ground surface increases gradually from the fifth irradiation angle Pd5 to the sixth irradiation angle Pd6, it can be determined that the relative inclination angle of the ground surface in this range is larger than zero, and the relative height of the ground surface in this range is larger than zero.

<First Example of Relative Inclination Information>

In the present embodiment, the following describes the case where the inclination detection unit 16 detects, as the relative inclination information, the relative inclination angle of the ground surface in the distance measurement range in front of the own vehicle with respect to the ground surface where the own vehicle is located. For example, as shown in FIG. 18, the inclination detection unit 16 selects the two measured values of distance of the ground surfaces close to the point which is located ahead by the determination distance from the own vehicle, and the two heights of the ground surfaces corresponding to these with respect to the irradiation center line; and calculates, as the relative inclination angle, an inclination angle α of a straight line which connects these two points, with respect to the irradiation center line.

<Second Example of Relative Inclination Information>

In the present embodiment, the following describes the case where the inclination detection unit 16 detects, as the relative inclination information, the relative height of the up and down direction of the ground surface, which is ahead by the determination distance from the own vehicle, with respect to the ground surface where the own vehicle is located. For example, as shown in FIG. 18, the inclination detection unit 16 selects the two measured values of the distance of the ground surfaces close to the point which is located ahead by the determination distance from the own vehicle, and the two heights of the ground surfaces corresponding to these with respect to the irradiation center lines; and calculates a height of the ground surface corresponding to the determination distance with respect to the irradiation center line, based on these two points. Then, the inclination detection unit 16 calculates, as the relative height, a height β by subtracting the height of the ground surface where the own vehicle is located with respect to the irradiation center line, from the height of the ground surface corresponding to the determination distance with respect to the irradiation center line.

<Control Behavior>

Figure 19A:
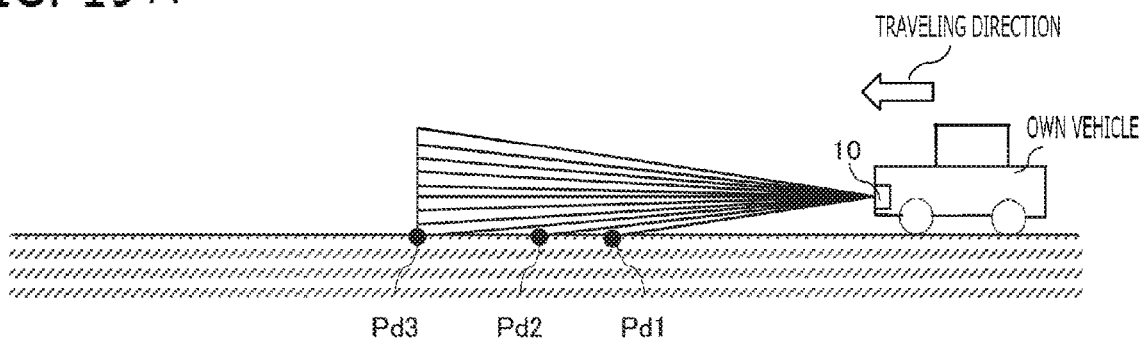
FIG. 19A to FIG. 19D are figures for explaining the control behavior according to Embodiment 2.

FIG. 19A to FIG. 19D show behavior in the case of performing moving control of the irradiation angle range of the up and down direction according to the present embodiment. As shown in FIG. 19A, when there is no inclination of the front ground surface, the ground surface is detected at the irradiation angles Pd1, Pd2, Pd3. But, based on the distance to the ground surface detected at each irradiation angle Pd1, Pd2, Pd3, it is determined that the relative inclination angle or the relative height is zero; and the irradiation angle range is set to the reference range, and is not moved to the up side or the down side. The irradiation angle range of the up and down direction is set appropriately.

Figure 19B:
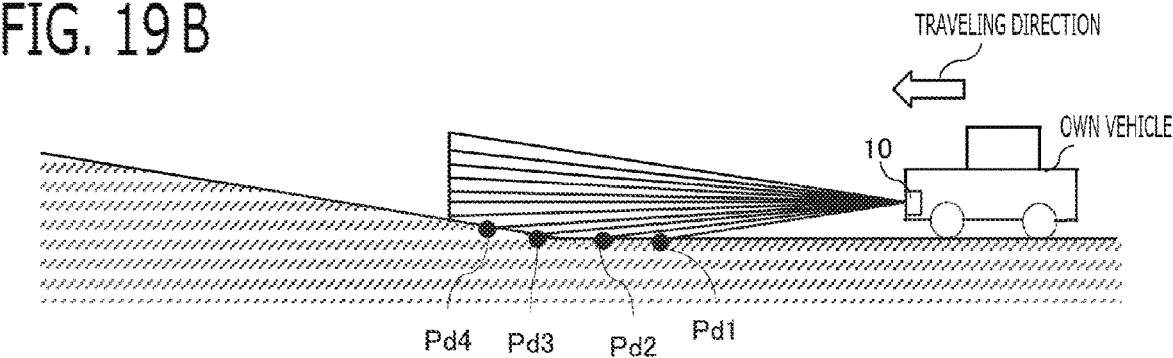
Figure 19C:
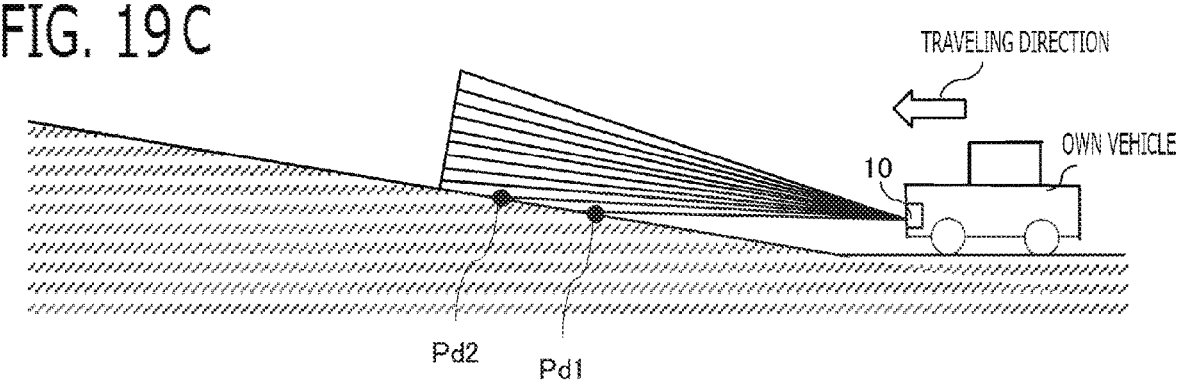

After that, as shown in FIG. 19B, the ground surface in front of the own vehicle starts to incline; and similarly to FIG. 18, at the irradiation angles Pd3, Pd4, the distance of the inclined ground surface is measured. As a result, the relative inclination angle or the relative height becomes larger than zero. In the subsequent calculation cycle, as shown in FIG. 19C, the irradiation angle range is moved to the up side, and the irradiation angle range of the up and down direction is set appropriately. Also in FIG. 19C, at the irradiation angles Pd1, Pd2, with respect to the irradiation center line which is parallel to the current traveling direction of the vehicle, the inclination of the ground surface is detected. Successively, the irradiation angle range is moved to the up side, and the irradiation angle range of the up and down direction is set appropriately.

Figure 19D:
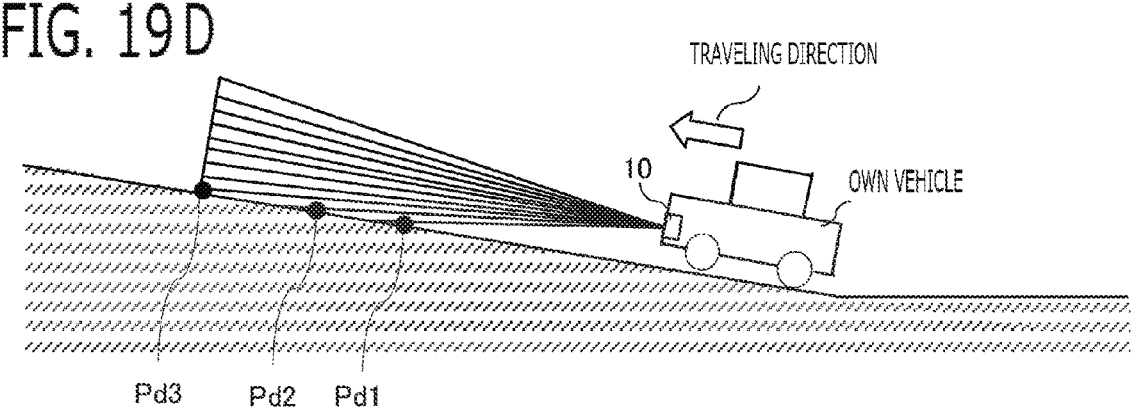

On the other hand, as shown in FIG. 19D, when the own vehicle starts to run the inclined surface, the irradiation center line is also parallel to the inclined surface. Therefore, it is determined that the relative inclination angle or the relative height is zero; and the irradiation angle range is set to the reference range, and is not moved to the up side or the down side. The irradiation angle range of the up and down direction is set appropriately. In this way, without depending on the external apparatus, the inclination of the front ground surface is detected in real time. And, according to the detected inclination of the ground surface, the irradiation angle range of the up and down direction is set appropriately.

OTHER EMBODIMENTS

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the above-mentioned Embodiments, there has been explained the case where the inclination detection unit 16 detects the relative inclination information based on the information obtained from the car navigation apparatus 30 or the distance calculation unit 15. However, embodiments of the present disclosure are not limited to the foregoing case. That is to say, the inclination detection unit 16 may obtain the relative height information of the up and down direction of the ground surface in front of the own vehicle with respect to the ground surface where the own vehicle is located, from one or both of the monitoring camera and the millimeter wave radar as external apparatus; and detect the relative inclination information based on the relative height information.

Based on the irradiation direction and a time difference from irradiating the millimeter wave to front of the own vehicle until receiving the reflected wave reflected by the object which exists ahead, the millimeter wave radar detects the distance to the ground surface which exists at each irradiation angle. Based on each irradiation angle with respect to the traveling direction of the own vehicle, and the distance of the ground surface at each irradiation angle, the inclination detection unit 16 obtains the information on the relative height of the up and down direction of the ground surface in front of the vehicle, as similar to Embodiment 2. By performing various kinds of well-known image processing to the picture in front of the own vehicle imaged by the camera, the monitoring camera detects the distance to the ground surface which exists at each point of the picture. Based on the angle at each point with respect to the traveling direction of the own vehicle and the distance of the ground surface at each point, the inclination detection unit 16 obtains the information on the relative height of the up and down direction of the ground surface in front of the vehicle, as similar to Embodiment 2.

(2) In each of the above-mentioned Embodiments, there has been explained the case where the scanning mechanism 12 is provided with the MEMS mirror 121. However, the scanning mechanism 12 may be provided with scanning mechanisms other than the MEMS mirror 121. For example, the scanning mechanism 12 may be provided with a rotary polygon mirror as the movable mirror, and may be provided with a mechanism which inclines a rotary shaft of the rotary polygon mirror so that the irradiation angle range of the up and down direction moves to the up side or the down side.

(3) In each of the above-mentioned Embodiments, there has been explained the case where the minute mirror is moved by Lorentz force. However, the movable mechanism of minute mirror is not limited to the electromagnetic method such as Lorentz force, may be a piezo-electric method using a piezoelectric element, or an electrostatic method using electrostatic force by the potential difference between mirror and electrode.

(4) In each of the above-mentioned Embodiments, there has been explained the case where the two-dimensional scan is performed by the scan as shown in FIG. 5 using the MEMS mirror 121. However, the two-dimensional scan may be performed by a Lissajous scan or a raster scan using the MEMS mirror 121; and a precessional scan may be performed using a sphere mirror.

(5) In each of the above-mentioned Embodiments, there has been explained the case where the two-dimensional scan is performed using the MEMS mirror 121 which rotates the mirror around two rotary shafts. However, the two-dimensional scan may be performed using two MEMS mirrors each of which rotates the mirror around one rotary shaft.

(6) In each of the above-mentioned Embodiments, there has been explained the case where the laser beam of the one laser beam source 111 is reflected by the MEMS mirror 121. However, the laser beams of plural laser beam sources 111 may be reflected by the MEMS mirror 121.

(7) In each of the above-mentioned Embodiments, there has been explained the case where the light detector 131 receives the reflected light L2 reflected by the MEMS mirror 121 and the collection mirror 133. However, the light detector 131 may receive directly the reflected light L2 reflected by the object.

(8) In each of the above-mentioned Embodiments, there has been explained the case where a type which transmits and receives pulsed light using the incoherent detection method is used. A type which transmits and receives pulsed light using a coherent detection method may be used. A type which transmits and receives the laser beam to which intensity modulation was performed by the sine wave may be used. It may be an incoherent FMCW (Frequency Modulated Continuous Waves) method. And, it may be a coherent FMCW method.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A laser distance measuring apparatus comprising:
a laser beam generator that emits a laser beam;
a movable mirror that changes an irradiation angle of the laser beam irradiated to a front of an own vehicle, between a right and left direction and an up and down direction, with respect to a traveling direction of the own vehicle;
a scanning controller that controls the movable mirror to perform a two-dimensional scan which scans the laser beam in an irradiation angle range of the right and left direction with respect to the traveling direction of the own vehicle and scans the laser beam in an irradiation angle range of the up and down direction with respect to the traveling direction of the own vehicle;
a light receiver that receives a reflected light of the laser beam reflected by an object in front of the own vehicle, and outputs a light receiving signal;
a distance calculator that calculates a distance to the object which exists at the irradiation angle, based on the emitted laser beam, the light receiving signal, and the irradiation angle; and
an inclination detector that detects a relative inclination information of the up and down direction of a ground surface in the front of the own vehicle with respect to a ground surface where the own vehicle is located,
wherein the scanning controller moves the irradiation angle range of the up and down direction to an up side or a down side according to the relative inclination information, and
wherein the inclination detector, about each irradiation angle of the up and down direction in a central part of the irradiation angle range of the right and left direction, based on an irradiation angle of the up and down direction with respect to an irradiation center line which is parallel to the traveling direction of the vehicle, and the calculated distance, calculates a height of a ground surface with respect to the irradiation center line; among the calculated results about respective irradiation angles of the up and down direction in the central part, selects two calculated distances which are close to a point located ahead by a determination distance from the own vehicle, and selects two heights of the ground surface with respect to the irradiation center line corresponding to the selected two calculated distances; calculates a height of the ground surface corresponding to the determination distance with respect to the irradiation center line, based on the selected two calculated distances and the two heights; and calculates, as the relative inclination information, a relative height obtained by subtracting a height of the ground surface where the own vehicle is located with respect to the irradiation center line, from the height of the round surface corresponding to the determination distance with respect to the irradiation center line.

2. A laser distance measuring apparatus comprising:
a laser beam generator that emits a laser beam;
a movable mirror that changes an irradiation angle of the laser beam irradiated to a front of an own vehicle between a right and left direction and an up and down direction with respect to a traveling direction of the own vehicle;
a scanning controller that controls the movable mirror to perform a two-dimensional scan which scans the laser beam in an irradiation angle range of the right and left direction with respect to the traveling direction of the own vehicle and scans the laser beam in an irradiation angle range of the up and down direction with respect to the traveling direction of the own vehicle;
a light receiver that receives a reflected light of the laser beam reflected by an object in front of the own vehicle, and outputs a light receiving signal;
a distance calculator that calculates a distance to the object which exists at the irradiation angle, based on the emitted laser beam, the light receiving signal, and the irradiation angle; and
an inclination detector that detects a relative inclination information of the up and down direction of a ground surface in the front of the own vehicle with respect to a ground surface where the own vehicle is located,
wherein the scanning controller moves the irradiation angle range of the up and down direction to an up side or a down side according to the relative inclination information, and
wherein the inclination detector, about each irradiation angle of the up and down direction in a central part of the irradiation angle range of the right and left direction, based on an irradiation angle of the up and down direction with respect to an irradiation center line which is parallel to the traveling direction of the vehicle, and the calculated distance, calculates a height of a ground surface with respect to the irradiation center line; among the calculated results about respective irradiation angles of the up and down direction in the central part, selects two calculated distances which are close to a point located ahead by a determination distance from the own vehicle, and selects two heights of the ground surface with respect to the irradiation center line corresponding to the selected two calculated distances, and calculates, as the relative inclination information, an inclination angle of a straight line which connects the selected two points, with respect to the irradiation center line.

* * * * *